(12) United States Patent
Robins

(10) Patent No.: US 7,503,126 B2
(45) Date of Patent: Mar. 17, 2009

(54) WALL-HANGING-AID DEVICE AND METHOD OF USE

(76) Inventor: Antony John Robins, 95 Collinwood Rd., Maplewood, NJ (US) 07040-1037

( * ) Notice: Subject to any disclaimer, the term of this patent is extended or adjusted under 35 U.S.C. 154(b) by 62 days.

(21) Appl. No.: 11/697,681

(22) Filed: Apr. 6, 2007

(65) Prior Publication Data
US 2007/0234584 A1 Oct. 11, 2007

Related U.S. Application Data

(60) Provisional application No. 60/790,677, filed on Apr. 10, 2006.

(51) Int. Cl.
*G01B 3/10* (2006.01)
*G01B 5/14* (2006.01)

(52) U.S. Cl. .............................. 33/613; 33/759; 33/760; 33/764

(58) Field of Classification Search .................... 33/342, 33/407, 526, 528, 562, 613, 644, 645, 668, 33/679, 755, 759, 760, 764, 809
See application file for complete search history.

(56) References Cited

U.S. PATENT DOCUMENTS

| | | | | |
|---|---|---|---|---|
| 3,492,737 A * | 2/1970 | Swanson | ...................... | 33/809 |
| 3,514,863 A * | 6/1970 | Moll | ............................ | 33/764 |
| 3,516,165 A * | 6/1970 | Pfeffer | ......................... | 33/574 |
| 3,842,510 A * | 10/1974 | Elliott | ........................... | 33/528 |
| 4,220,309 A | 9/1980 | Eisen | | |
| 4,241,510 A | 12/1980 | Radecki | | |
| 5,092,057 A * | 3/1992 | Hoenig, Sr. | ................... | 33/669 |
| 5,103,574 A | 4/1992 | Levy | | |
| 5,179,787 A * | 1/1993 | Ostrowski | ..................... | 33/613 |
| D340,194 S * | 10/1993 | White | .......................... | D10/65 |
| 5,451,027 A | 9/1995 | McHenry | | |
| 6,032,378 A | 3/2000 | Null | | |
| 6,049,991 A | 4/2000 | Gruenberg | | |
| 6,223,446 B1 * | 5/2001 | Potter | .......................... | 33/764 |
| 6,305,093 B1 | 10/2001 | Venola | | |
| 6,421,928 B1 * | 7/2002 | Miller | .......................... | 33/520 |
| 6,467,179 B1 * | 10/2002 | Wolf | ............................ | 33/474 |
| 6,473,983 B1 | 11/2002 | Gier | | |
| 6,739,065 B2 | 5/2004 | Hofmeister | | |
| 2002/0007561 A1 * | 1/2002 | Malizia | ........................ | 33/528 |
| 2003/0033722 A1 * | 2/2003 | Lanham | ........................ | 33/374 |
| 2006/0021243 A1 * | 2/2006 | Spanski et al. | ................. | 33/760 |
| 2007/0079521 A1 * | 4/2007 | Hill | ............................... | 33/809 |

FOREIGN PATENT DOCUMENTS

JP    2000193402 A  *  7/2000

* cited by examiner

*Primary Examiner*—R. A. Smith
(74) *Attorney, Agent, or Firm*—Peter A. Haas Esquire LLC; Peter A. Haas

(57) ABSTRACT

A wall-hanging-aid device comprises four retractable tape measures encased in a housing and at least one template for aligning a hanging position or hooking position of an object on a vertical surface, such as a picture on a wall. In one embodiment a first vertical tape measure extends from the bottom of the housing and includes a measurement scale and a lip for securing the tape to an item being measured. Opposite this vertical tape measure, a single aligning fin or template extends from the housing and includes a marking-hole guide for aligning the desired hooking position on the wall. The two other tape measures extend in opposite directions generally perpendicular to the vertical tape measure.

18 Claims, 17 Drawing Sheets

WALL-HANGING-AID DEVICE AND METHOD OF USE

PRIORITY CLAIM

This application claims benefit of U.S. Provisional Patent Application No. 60/790,677 filed on 10 Apr. 2006 by the common inventor Antony John Robins for all purposes.

BACKGROUND

This invention relates to devices and methods for aligning objects on a vertical surface and more specifically to an integrated device for aiding the hanging of items, such as pictures, on a wall.

Hanging an object on a wall, such as a picture, mirror, and other similar items, frustrates many because the precise location of the strung wire, slots, hooks, or other hanging-assist features cannot be seen. As a result, many undertake elaborate efforts to hang an object on a wall. Some use the tried-and-true method of guessing—this results in multiple holes in the wall, a crooked picture, an imprecise location, or all three missteps. Others precisely measure the objects size, calculate the center, measure a height from the floor or ceiling, and select another feature to translate a horizontal measure, and proceed to hang the object. Both methods are prone to numerous errors that both frustrate the individual and damage the wall. Moreover, these methods become even more cumbersome when attempting to hang heavy objects requiring multiple suspension locations in the wall.

Many devices were introduced in an attempt to minimize frustration and improve the methods of hanging objects on walls. For example, U.S. Pat. No. 6,739,065, titled "Picture Hanging Device," issued to Hofmeister et al. on 25 May 2004 recites numerous examples of prior attempts at improving the status quo, and this reference is cited herein for all purposes. This reference, however, does not fully solve the problem of locating a position on the wall to efficiently hang an object. This reference discloses an apparatus that includes a vertically aligned slot, a scale parallel thereto, and a guide feature to position atop the picture frame of interest. This reference, however, does not include means for locating the horizontal position of the desired wall-mounting hanger.

Other references also disclose apparatus and methods to assist the vertical location of a hanger on a wall: For example, U.S. Pat. No. 4,220,309, titled "Method and Apparatus for Positioning Hanging Device on a Wall," issued to Eisen et al. on 2 Sep. 1980; U.S. Pat. No. 6,032,378, titled "Hand Tool for Hanging Pictures," issued to Null on 7 Mar. 2000; and U.S. Pat. No. 6,049,991, titled "Picture Hanging Position Marking Tool", issued to Gruenberg et al. on 18 Apr. 2000. But, each of these references lacks horizontal aligning means.

Other prior art references disclose horizontal aligning means, but lack sufficient vertical aligning means: For example, U.S. Pat. No. 5,103,574, titled "Measuring Tool for Hanging up Pictures and the Like," issued to Levy on 14 Apr. 1992; U.S. Pat. No. 5,451,027, titled "Picture Hanging Device," issued to McHenry on 19 Sep. 1995; U.S. Pat. No. 6,473,983, titled "Leveling Device," issued to Gier on 5 Nov. 2002; and U.S. Pat. No. 6,305,093, titled "Hanger Tool to Facilitate Centering and Hanging of a Component," issued to Venola on 23 Oct. 2001.

Thus, it is desirable to have a device that aligns in both vertical and horizontal directions. One prior-art apparatus attempts to provide both vertical and horizontal alignment: U.S. Pat. No. 4,241,510, titled "Aid for Hanging Pictures," issued to Radecki on 30 Dec. 1980. This reference discloses a T-shaped, rigid apparatus with vertical and horizontal scales and respective sliding mechanisms to mark the desired locations of holes to be placed on the wall for the hangers. This apparatus, however, is prone to damage during use and storage due to its rigid nature. Further, it does not provide for easy marking of locations on the wall, and increases the propensity for error.

Therefore, there remains a need for a device that aids in hanging an object on a wall. Such a device should include means for locating the center of an object and easily translating the desired hanger-placement position to the wall. It is also desirable for such a device to have leveling means, be easy to use, be compact when not being used, and be ergonomically designed and pleasing to the eye.

SUMMARY OF THE INVENTION

The present invention overcomes shortcomings in the prior art and provides a device and method of use that facilitates hanging of objects on a wall. The present invention includes leveling means, scaling means, aligning means and means to easily translate locations from the object to the wall.

The present invention, further, provides for a durable, compact, ergonomic, and pleasing design. Other advantages include:

Retractable top tape measure;
Retractable first and second horizontal tape measures;
Retractable bottom measure
Dual, hinged vertical templates;
Alignment devices for horizontal and vertical locations;
Horizontal spirit level;
Laser level;
Stud finder;
Compact size;
Durable construction;
Optional infrared distance locator; and
Optional vertical spirit level.

For example, in one embodiment, the present invention comprises a wall-hanging-aid device comprised of four retractable metal tape measures encased in a housing. A first, top tape measure includes holes running the length of the scale and the tape measure extends from the top of the housing. These holes enable marking a hanging spot on a wall. At the top of this tape is a lip used to secure the device on to the top of what you are measuring/hanging. The two other tape measures extend in opposite directions at a right angle to the one at the top. The side tape measures are used to help center the top one; when making either one or two holes, and they extend to match the position of the pre-drilled holes on your object. On the end of each side tape measure is a template with numbered holes. The templates run vertically and are attached by a hinge to the side tape measures. This hinge enables the templates to fold flat against the housing when the tape measures are stored in the housing. On the front of the housing are three locking buttons for each of the three extendable tape measures as well as a spirit level and a stud finder indicator light. On the side is a laser level.

In another embodiment, the present invention includes a method for hanging a picture on a wall using a novel device. The method includes the steps of:

Placing the picture frame upside down on the table;
Placing the device on the back of the picture frame;
Pulling the side measuring tapes out to the edge of the picture frame and the parallel tape will move in the opposite directions, simultaneously and automatically;
Locking it into position;
Pushing the hole guide up against the wire until it is taut;

Pulling the top measure up to the top of the picture frame;
Locking it into position.

This enables a user to create a perfect template of the picture frame and ensures placement of the nail in the exact spot needed in the wall to hang the picture. Next, the user simply goes to the wall and places the device against the wall and adds the following steps to the method above:

Making a mark in the hole guide with a pencil on the wall;
Tapping in the nail.

This results in a perfect hanging job. For two hooks, repeat the same instructions above and add the following steps:

Pushing the device against the wire;
Extending the pair of arms; and
Extending the top (first vertical) tape measure.

DRAWING

DESCRIPTION OF THE INVENTION

Figure 1:
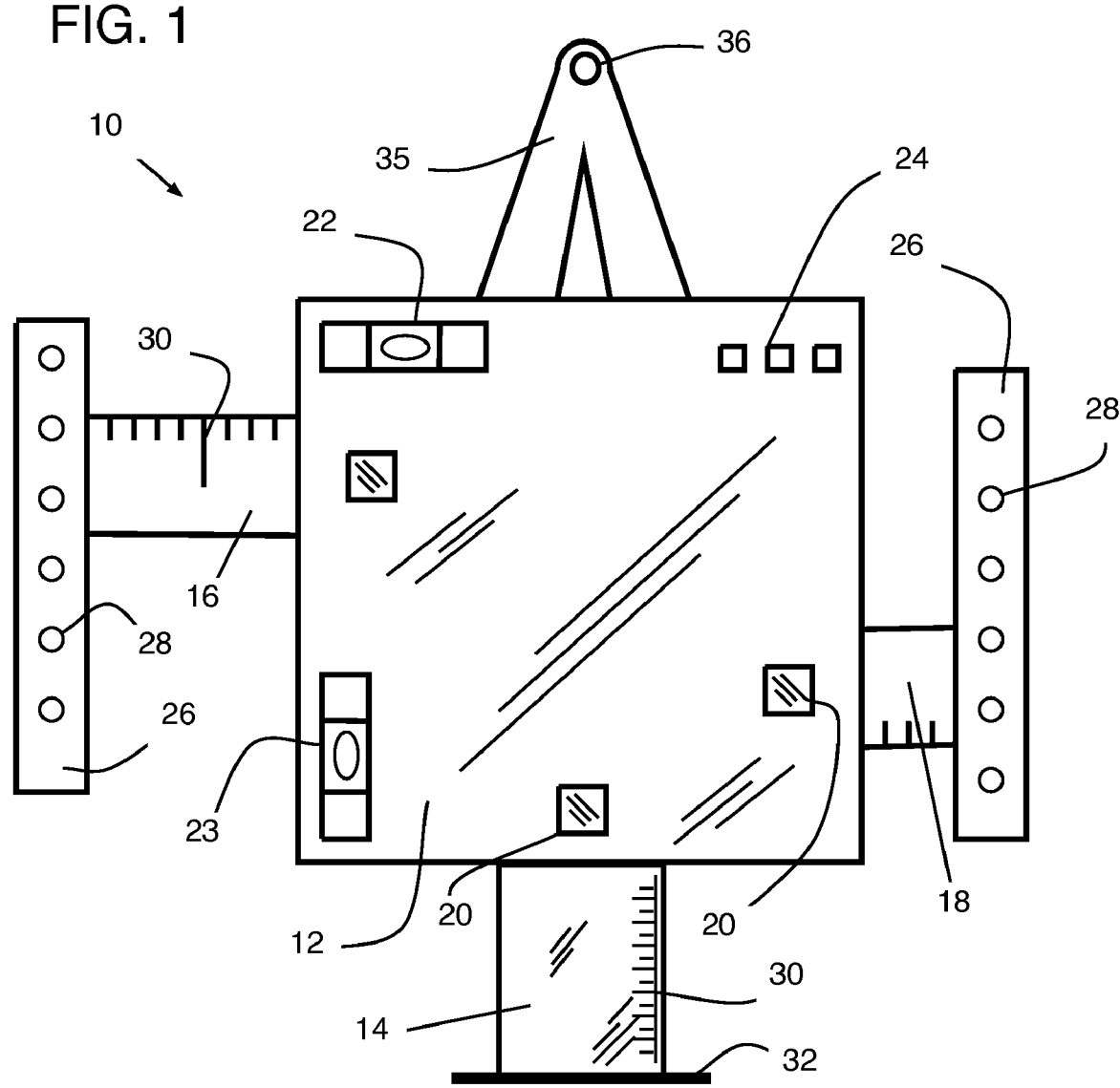
FIG. 1 is a top view of a first embodiment of the present invention.

The present invention, described herein and illustrated in the accompanying figures of the drawing, is portrayed through the use of exemplary embodiments that represent its spirit and scope. Further, in the various figures certain components may be omitted to more clearly illustrate a particular aspect of the invention. And, those skilled in the art will appreciate that various combinations of elements, substitutions of elements, omissions and deletions of elements will not deviate from the spirit and intent of the present invention. The scope of the invention shall be limited only by the appropriate construction of the claims that follow.

The present invention includes devices and methods of use to assist a person in hanging an object on a surface such as a framed-picture on a wall. The various embodiments of the device according to the present invention include mechanisms that enable a person to locate the correct position on the framed-picture for symmetric hanging on the wall. In one embodiment, the device contemplates that a single fastener (for example, a nail) is used to hang the picture-frame on the wall, and in a second embodiment the device contemplates dual-fasteners (for example, two nails) being used to hang the picture-frame on the wall. In addition to novel devices, the present invention contemplates varied methods of using the devices to efficiently and effectively hang pictures on walls.

Figure 2:
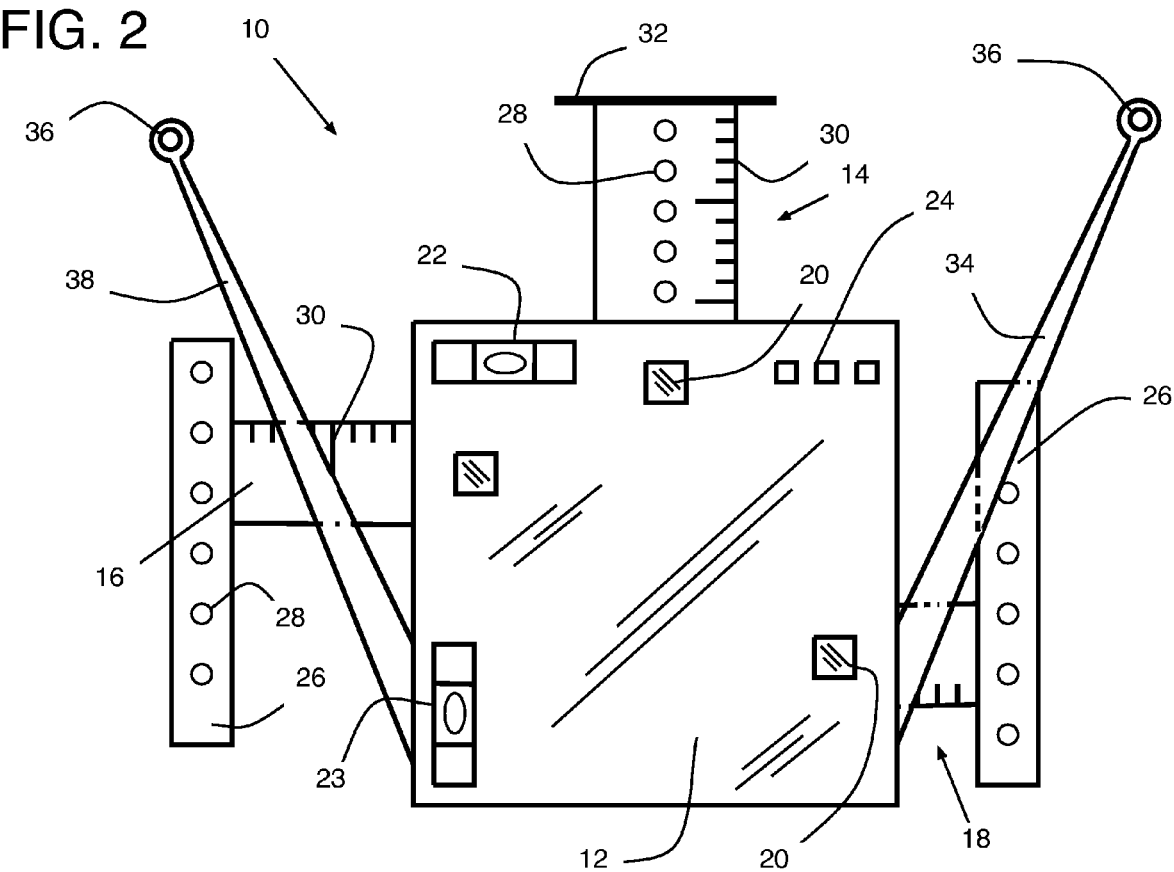
FIG. 2 is a top-view of an alternative embodiment of FIG. 1.
Figure 3:
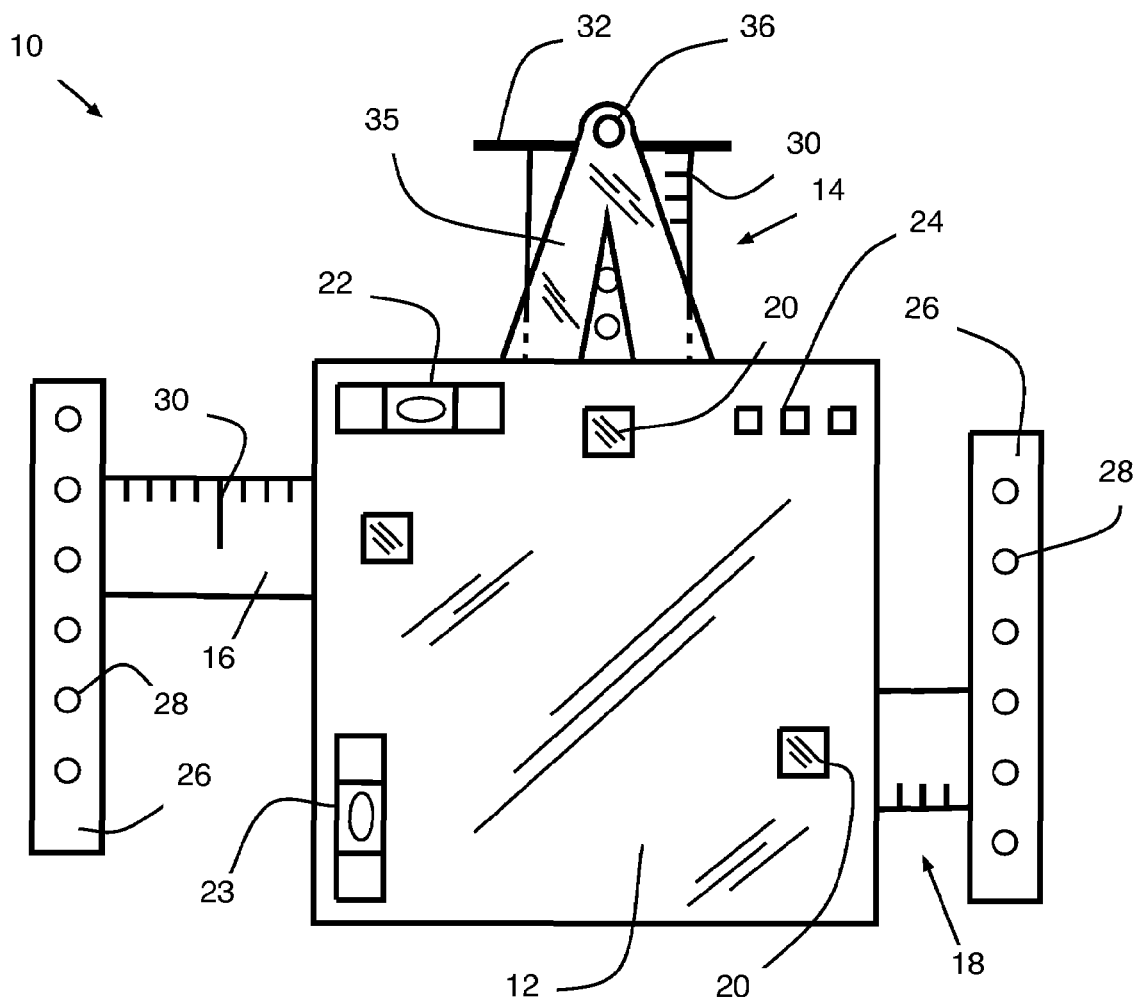
FIG. 3 is a top view of an alternative embodiment of FIG. 1.
Figure 4:
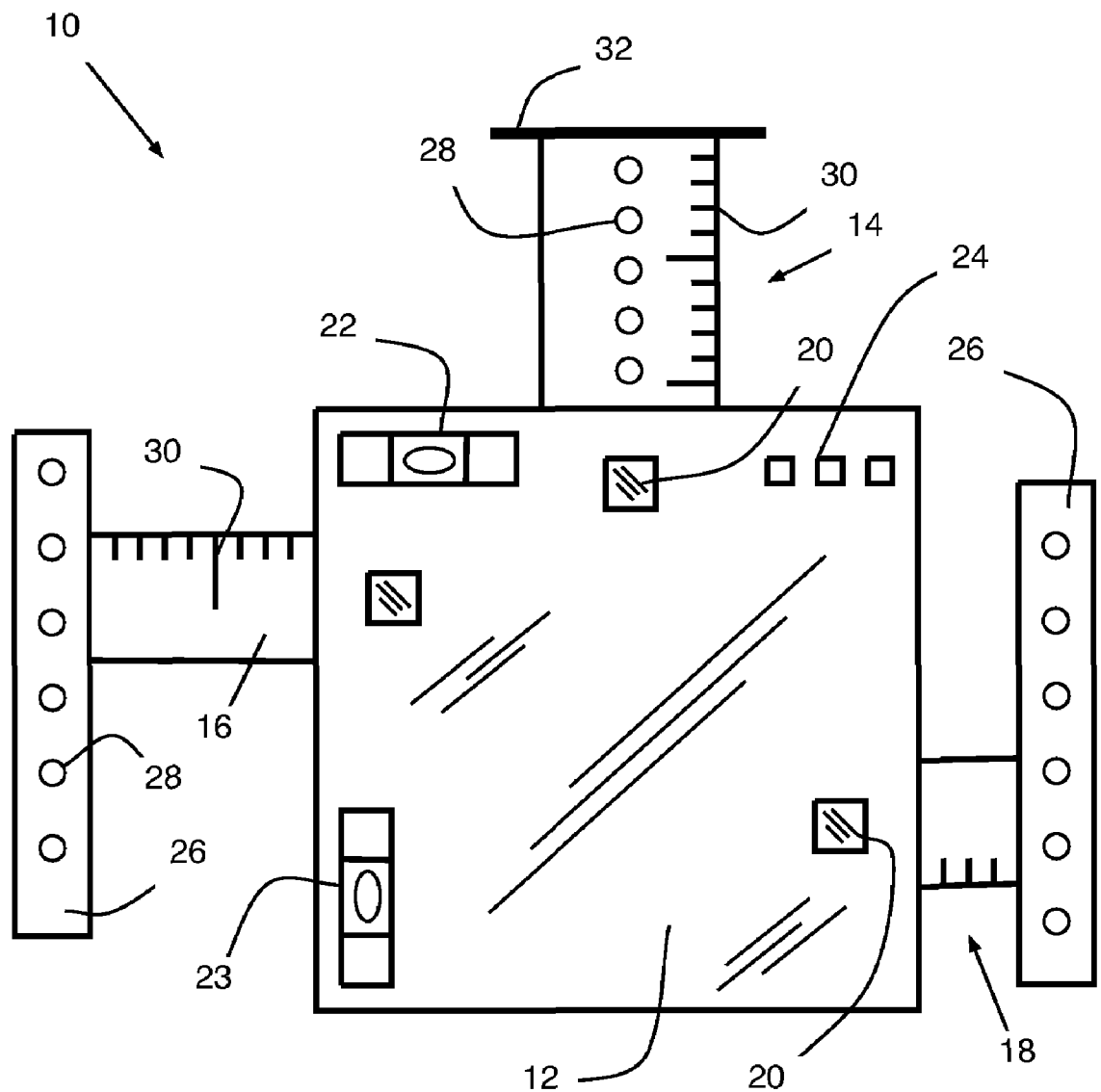
FIG. 4 is a top view of an alternative embodiment of FIG. 1.
Figure 5:
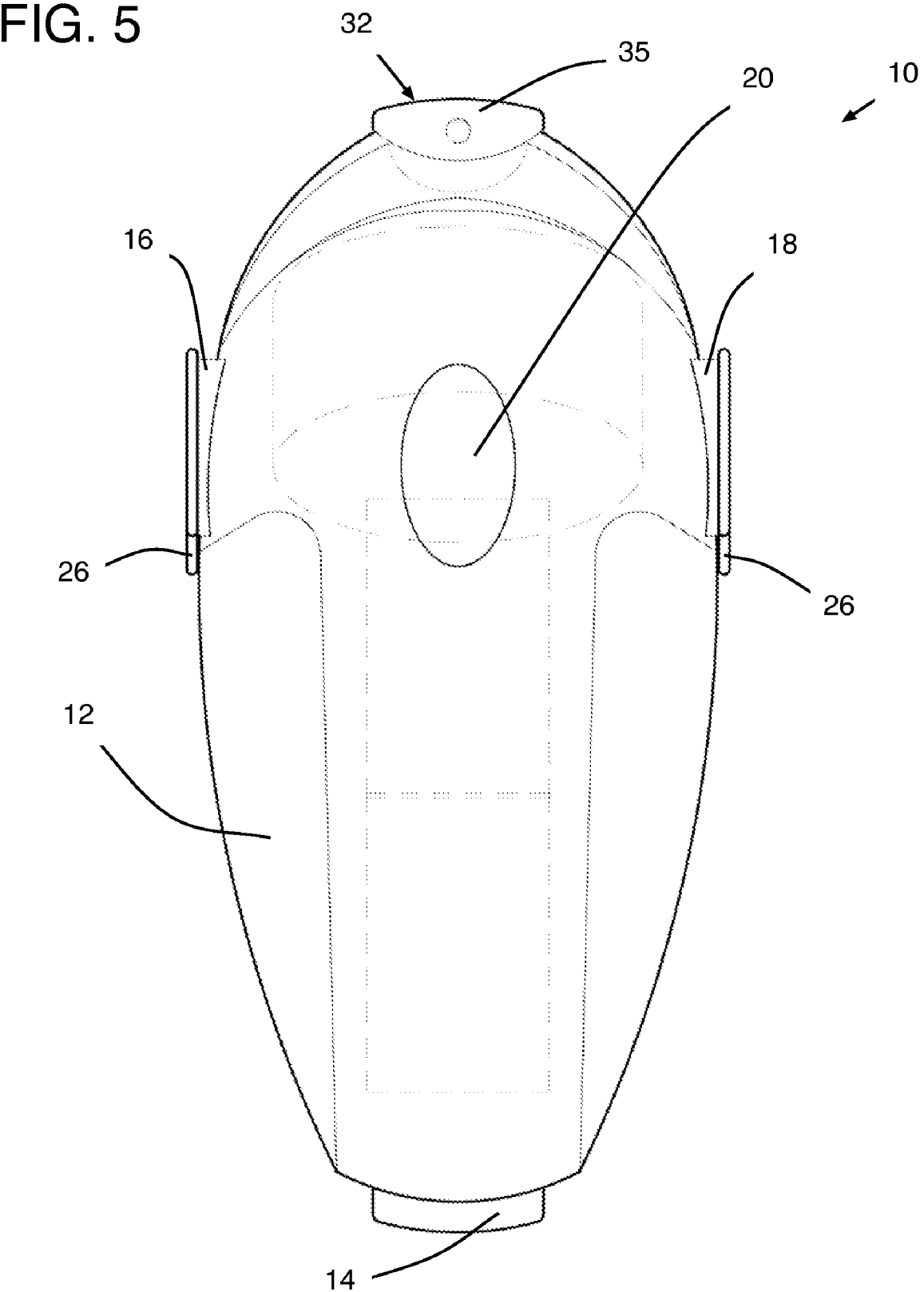
FIG. 5 is a top view of a second embodiment of the present invention.
Figure 6:
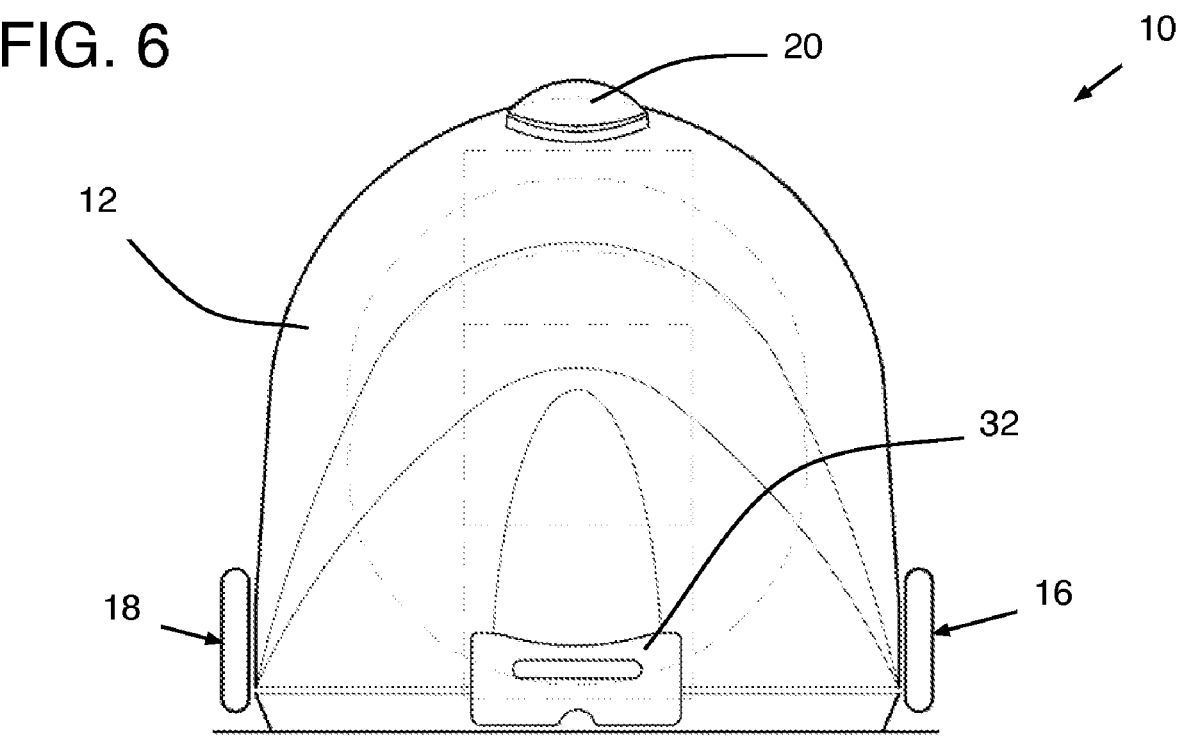
FIG. 6 is a front view of the embodiment of FIG. 5.
Figure 7:
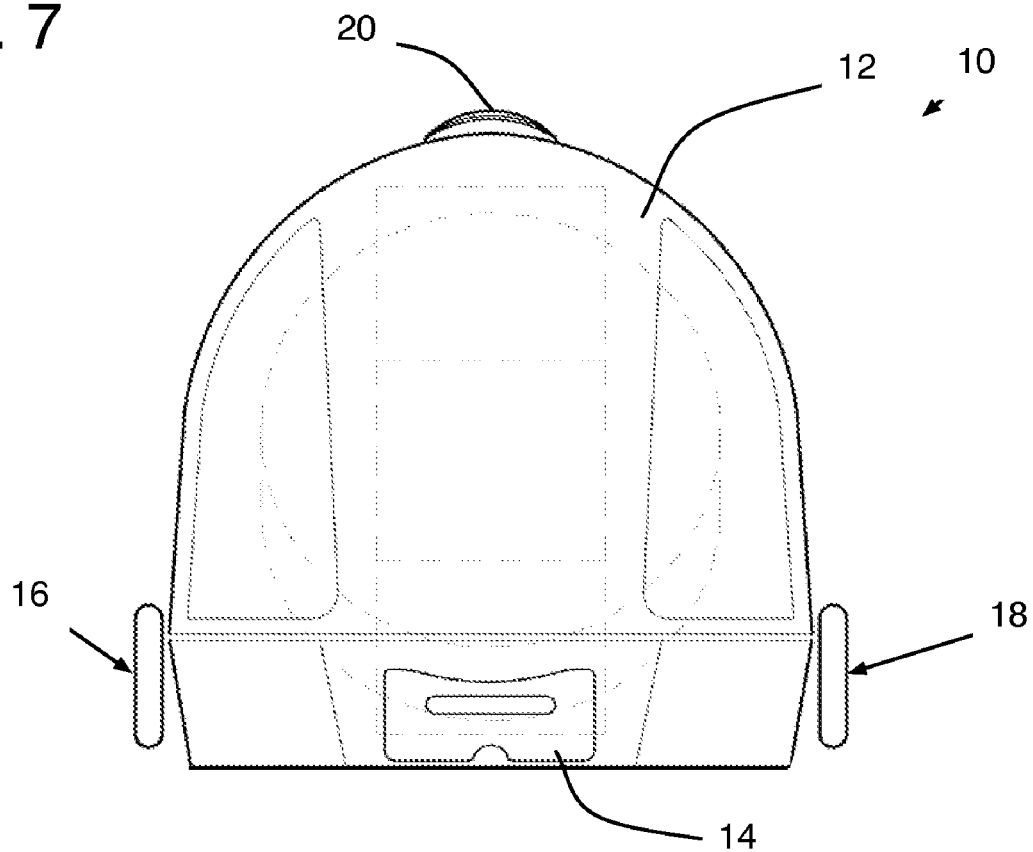
FIG. 7 is a back view of the embodiment of FIG. 5.
Figure 8:
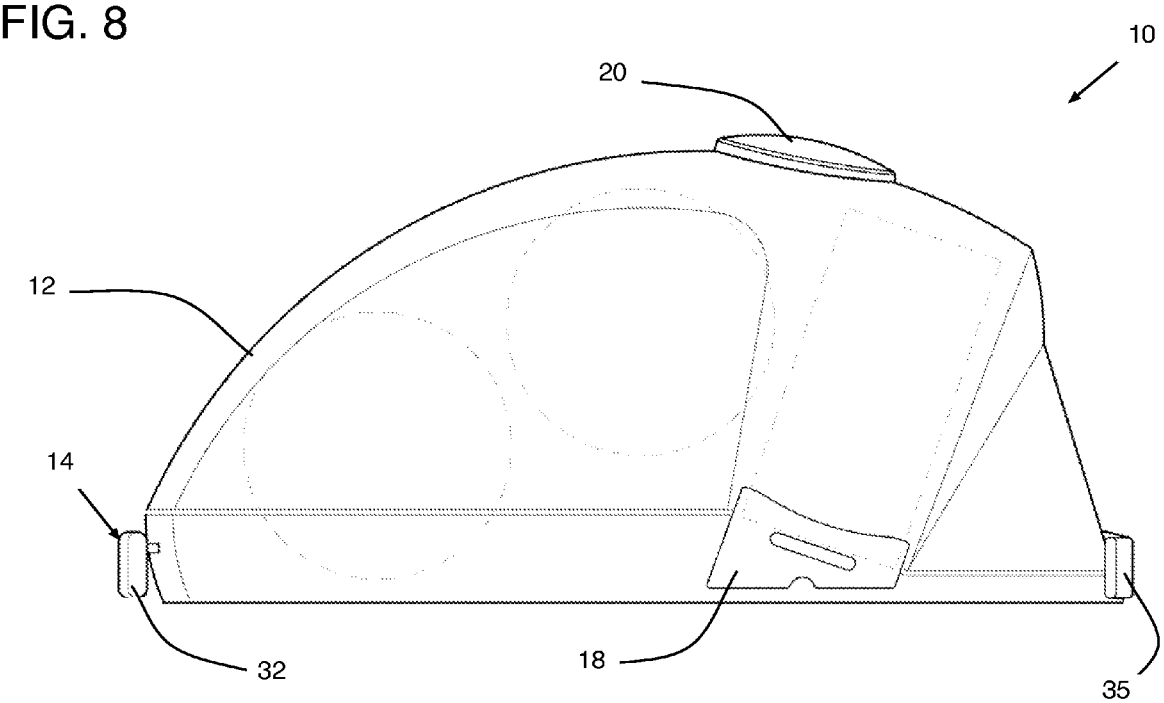
FIG. 8 is a right side view of the embodiment of FIG. 5.
Figure 9:
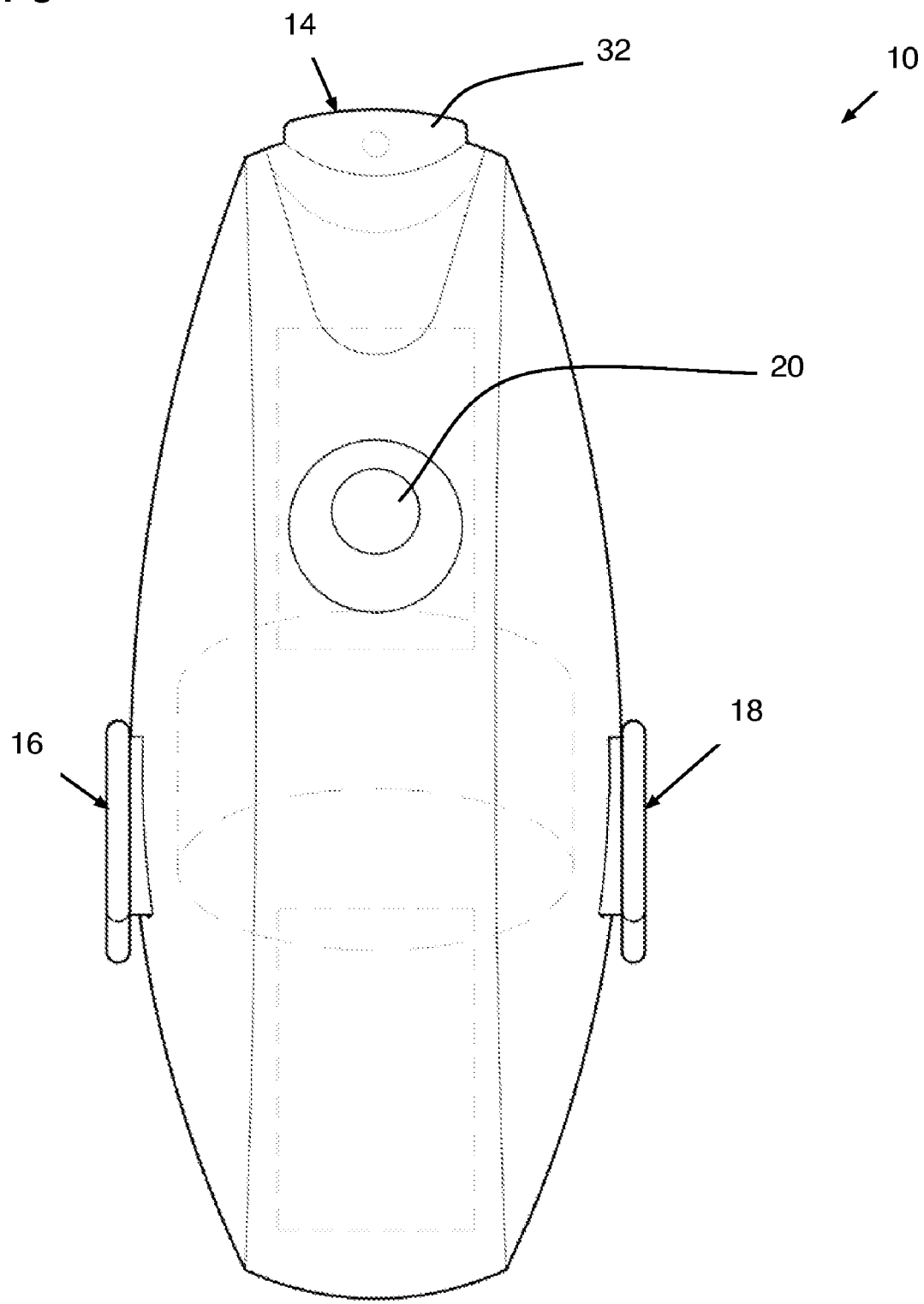
FIG. 9 is a top view of a third embodiment of the present invention.
Figure 10:
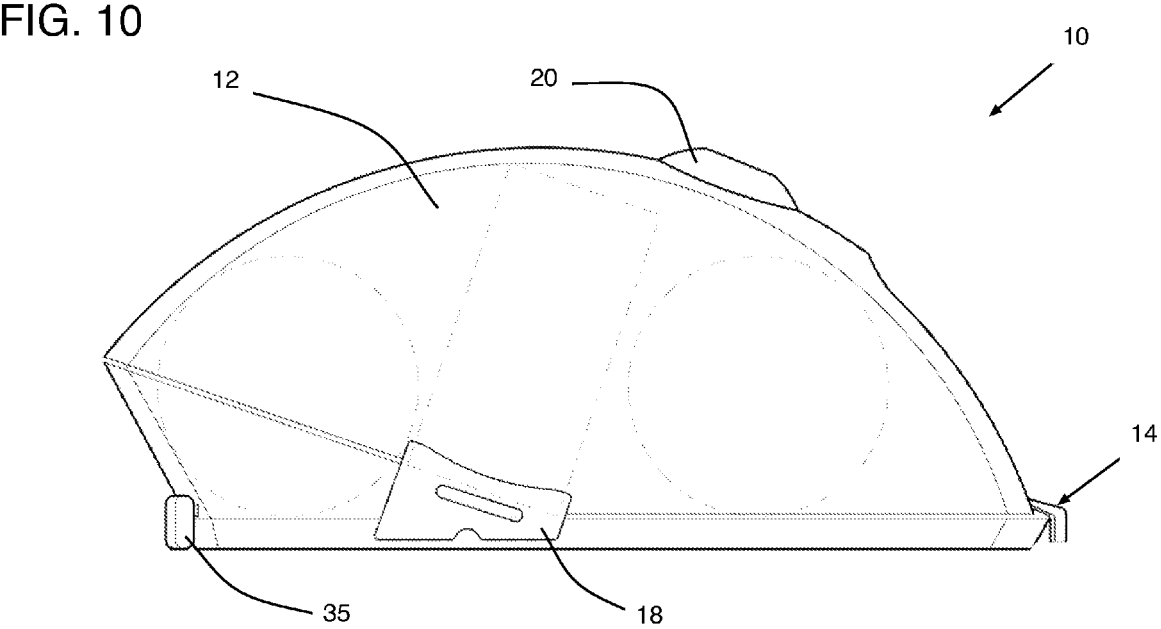
FIG. 10 is a right side view of the embodiment of FIG. 9.
Figure 11:
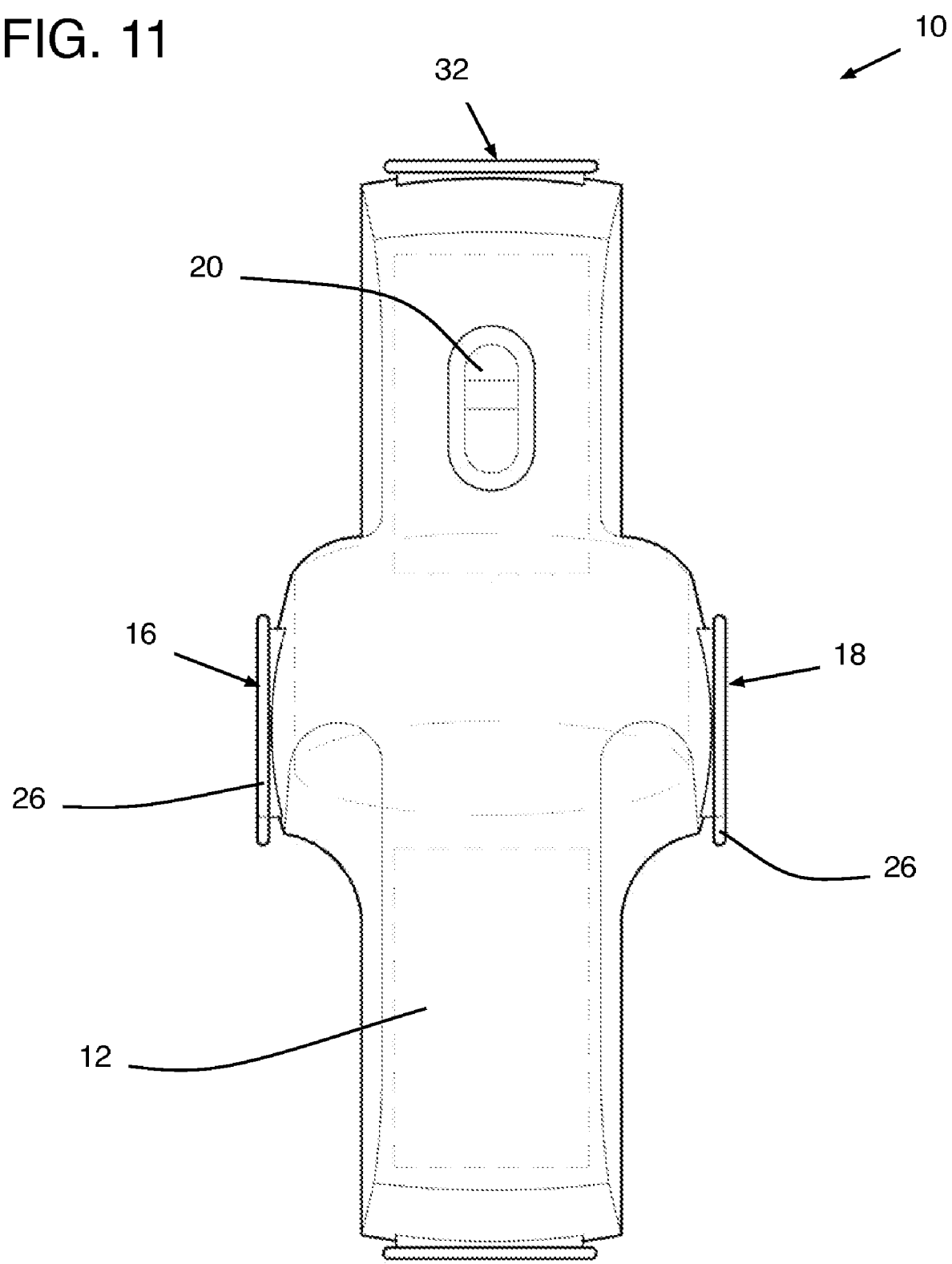
FIG. 11 is a top view of a fourth embodiment of the present invention.
Figure 12:
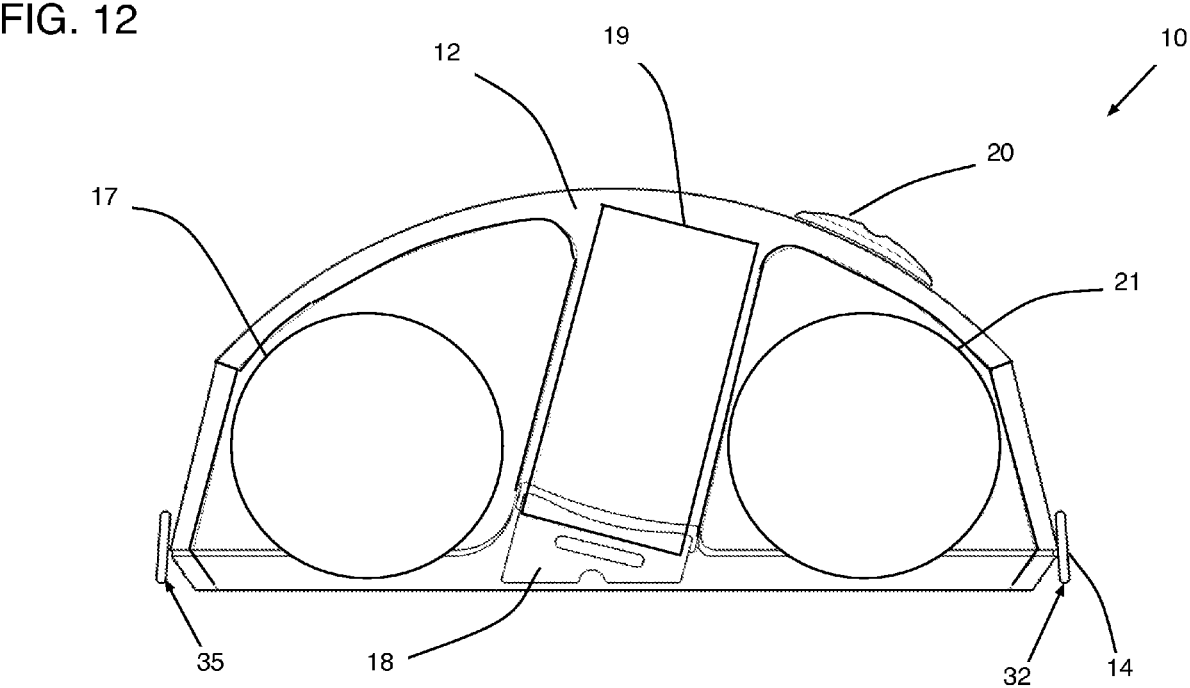
FIG. 12 is a right side view cross section of the embodiment of FIG. 11.

FIGS. 1 through 12 illustrate several embodiments of the present invention, of which some figures represent various configurations to improve the commercial or retail appeal of the invention. In one embodiment, for example as FIGS. 2, 3, and 4 illustrate, the present invention consists of a wall-hanging-aid device 10 comprising a housing body 12 adapted to contain a vertical retractable-arm mechanism 19 (shown generally in FIG. 12) such as a conventionally understood retracting tape measure having a recoil mechanism that causes the banded-wire tape body to re-wind when a lock-mechanism is actuated to release the tape body from a given extended position.

The housing further includes a first horizontal retractable-arm mechanism 21 and a second (or rear) horizontal retractable-arm mechanism 17, both of which operate in a similar manner as the vertical arm-mechanism previously described. The pair of horizontal tape measures extend simultaneously, that is as one side is pulled from the housing by a user, the opposite side tape measure automatically extends in direct correlation with the extension of the first. The housing body is further adapted to enable a portion of each retractable-arm mechanism to extend therethrough.

Additionally, as FIGS. 1, 2, 3, and 4 show, the first horizontal retractable-arm mechanism further includes a first horizontal retractable arm 16 including a second template means such as a plurality of marking-holes 28 arranged on a template member 26. The second horizontal retractable-arm mechanism 18 further includes a third template means such as the associated template member 26 with a plurality of spaced-apart marking-holes 26. The marking-holes 26 further include corresponding unique identifiers such as letters of the alphabet.

In one embodiment, the wall-hanging-aid device also includes a vertical retractable-arm mechanism 19 (shown, for example in FIG. 12), which includes a retractable vertical-arm 14 including a first template means such as a plurality of marking-holes 28 arranged on the arm as indicated in FIGS. 2, 3, and 4, for example.

Also, the wall-hanging-aid device includes a vertical retractable-arm mechanism includes a first vertical measuring means, such as a visual measuring scale 30, arranged on the retractable vertical-arm 14. A first template means, such as the aligning fin 35 of FIGS. 1 and 3 including an aligning-hole 36 adapted to permit a pen or pencil or other marking instrument to pass therethrough, locates on a protruding surface extending from the housing body 12 and disposed generally about perpendicular to a line of direction defined by a range of extension of the first horizontal retractable arm 16. This template means 35, in one embodiment, arranges generally about 180-degrees from a line defined by a range of extension of the retractable vertical-arm, as FIG. 1 shows.

Further, the housing body 12 adapts to present a visual means for determining both the horizontal and vertical level positions of the housing via a horizontal-level indication means 22 and a vertical-level indication means 23, both of which are spirit or bubble levels as commonly understood in the art. However, an electronic or LED level mechanism would work equally well.

The wall-hanging-aid device also includes a first horizontal measuring means, such as a linear scale 30, arranged on the first horizontal retractable-arm 16 and a similar second horizontal measuring means arranged on the second horizontal retractable-arm. The visual scale 30 includes standard English measurements, metric units, or both. It will also have standard frame sizes as default guides. Additionally, the housing 12 includes a stud-finder means 24 for locating wall studs, as would generally be understood in this art.

Each of the selectively extendable retractable-arms 14, 16, and 18 further include a locking mechanism to selectively hold the associated retractable arm in a fixed position. The lock mechanims (not shown in the figures) includes an actuator 20 conveniently located on the housing body 12.

Additionally, each retractable arm 14, 16, and 18 includes a feature for retaining the arm in a fixed position when extended. For example, the vertical arm 14 includes a lip element 32 arranged on its distal end and arranged generally perpendicular to direction of travel of the arm and forming a 90-degree angle with the arm, similar to the end on a conventional tape-measure. The pair of horizontal arms 16 and 18 includes a template member 26 that is hingeably attached at the distal end.

In another embodiment, illustrated in FIG. 2 for example, the housing 12 includes a vertical template means consisting of pair of extendable vertical template arms 38 and 34, each having an aligning-hole 36 arranged on its distal end. The first and second extending arm members 34 and 38 include a corresponding a proximal end which hingeably attaches to the housing 12. A linking means (not shown in the figures) couples the first and second extension arms 34 and 38 whereby selective rotation of the first extending arm causes a corresponding but opposite rotation of the second extending arm member.

In one embodiment, template arms 34 and 38 each include a respective retracting structural member that enables the arms to reduce their overall length sufficiently to store within the housing 12 when not in use. For example, the arms are configured to slide up and out of the top of the housing.

In yet another embodiment of the present invention, a wall-hanging-aid device 10 for locating a hanging position on a conventional wall having studs includes a housing body 12 adapted to contain a vertical retractable-arm mechanism 19, a first horizontal retractable-arm mechanism 17 and a second horizontal retractable-arm mechanism 21.

The housing body further adapts to enable a portion of each retractable-arm mechanism to extend therethrough. The first horizontal retractable-arm mechanism further comprising a first horizontal retractable arm 16 including a second template means including template member 26 having a plurality of marking-holes 28. The second horizontal retractable-arm mechanism having a second horizontal retractable arm member 18 and a third template means including a similar template member 26 and marking-holes 28. The vertical retractable-arm mechanism further comprises a first vertical measuring means 30 arranged on a retractable vertical-arm 14. A first template means such as the protruding fin 35 having a marking hole 36 arranges a surface of the housing so that it is disposed generally about perpendicular to a line of direction defined by a range of extension of the first horizontal retractable arm and being disposed generally about 180-degrees from a line defined by a range of extension of the retractable vertical-arm. And, the device 10 includes a stud-finder means 24 for locating the wall stud, the stud-finder means having a display apparatus, a portion of which is arranged on a visible surface of the housing.

The present invention further contemplates a method of using a wall-hanging-aid device. Various embodiments of the method, shown in FIGS. 13 through 23 include steps for locating a desired hanging position on a vertical wall for a particular object of interest, such as a picture having either a one-hanger or dual-hanger requirement.

In one embodiment, a method according to the present invention includes a method for using a wall-hanging-aid device to mark a vertical surface a desired hanging position of an object, the method comprises providing a wall-hanging-aid device having a first vertical template, a first retractable vertical-arm (top) and a second retractable vertical arm (bottom) and a first retractable horizontal arm and a second retractable horizontal arm; and locating a first hooking point on the object to be hung on the vertical surface.

Additional steps include: aligning the hole-guide according to the desired location on the back of the picture corresponding to where the hanging wire dips to support the frame; pulling the first vertical or top tape measure from the housing and locating the top edge of the frame; extending the pair of horizontal tape measures and aligning each respective edge of the horizontal tape measure to the corresponding right or left edge of the picture frame; pulling out the second vertical (or bottom) tape measure to find the bottom of the frame. FIGS. 14 to 17 show these steps.

Figure 13:
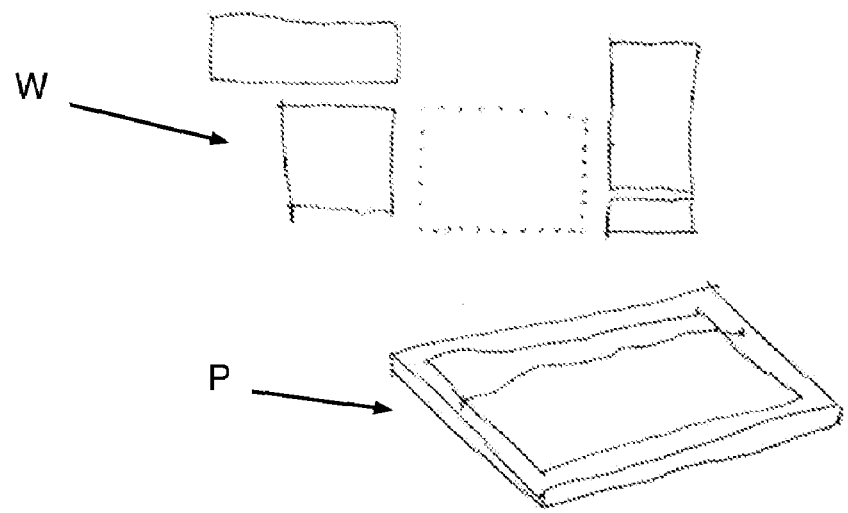
FIG. 13 is one possible environment of use of a first method according to the present invention.
Figure 14:
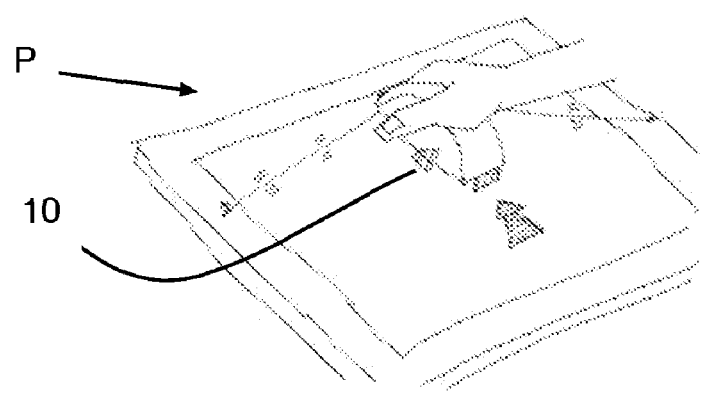
FIG. 14 shows a first step according to the method of FIG. 13.
Figure 15:
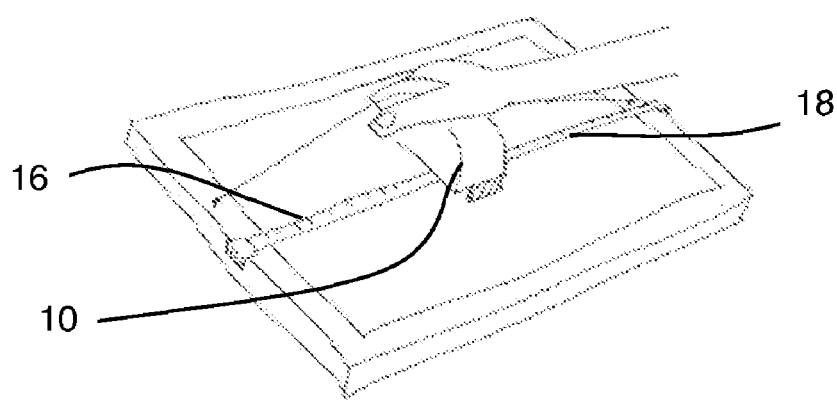
FIG. 15 shows a second step according to the method of FIG. 13.
Figure 16:
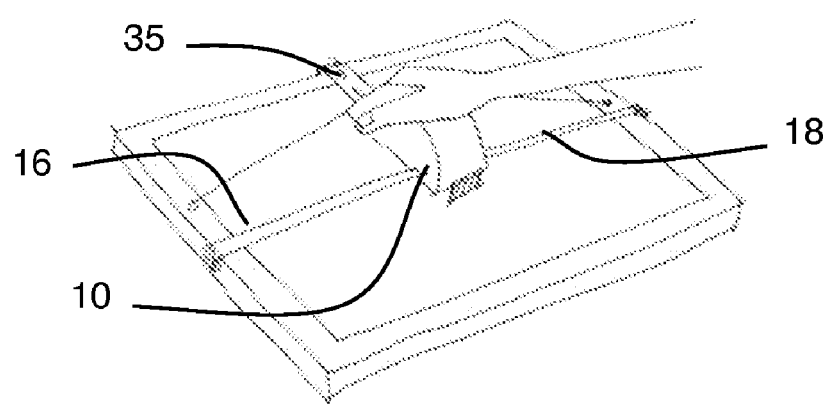
FIG. 16 shows a third step according to the method of FIG. 13.
Figure 17:
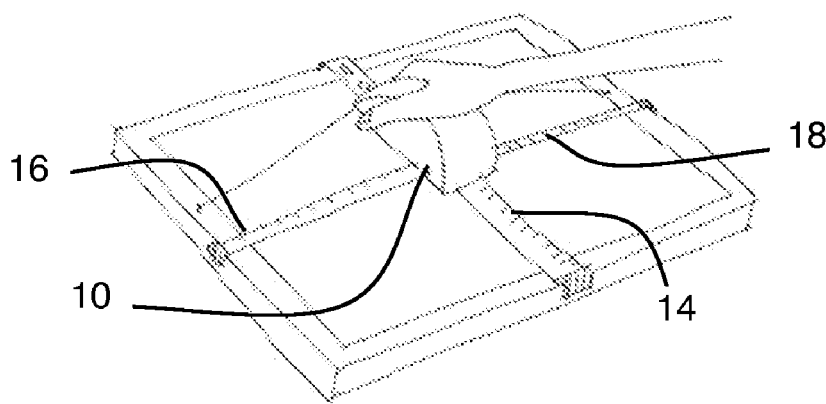
FIG. 17 shows a fourth step according to the method of FIG. 13.
Figure 18:
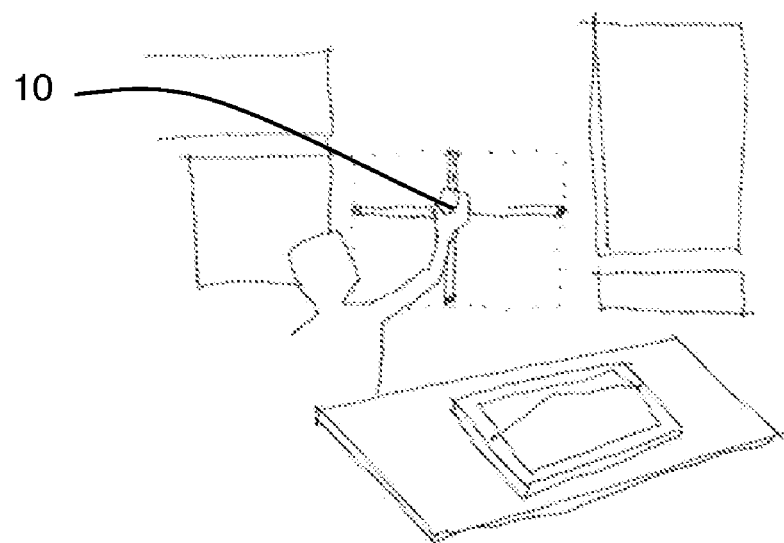
FIG. 18 shows a fifth step according to the method of FIG. 13.
Figure 21:
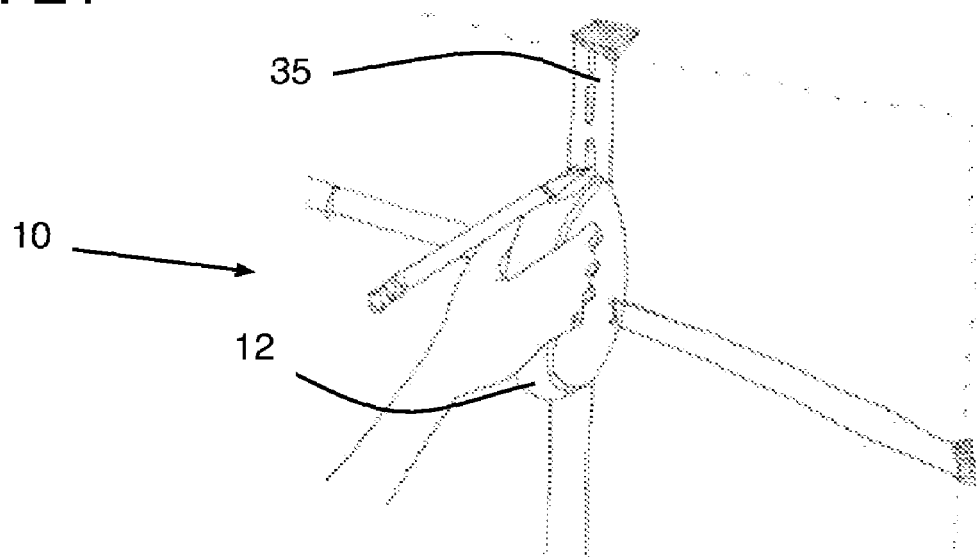
FIG. 21 shows another step according to the method of FIG. 19.
Figure 22:
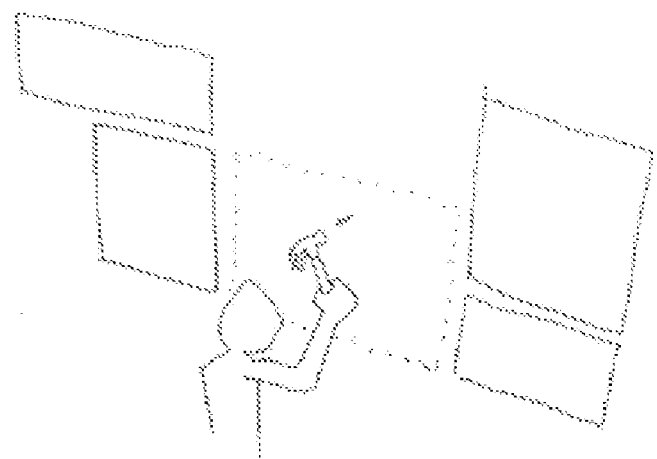
FIG. 22 shows a step according to a third method of the present invention.
Figure 23:
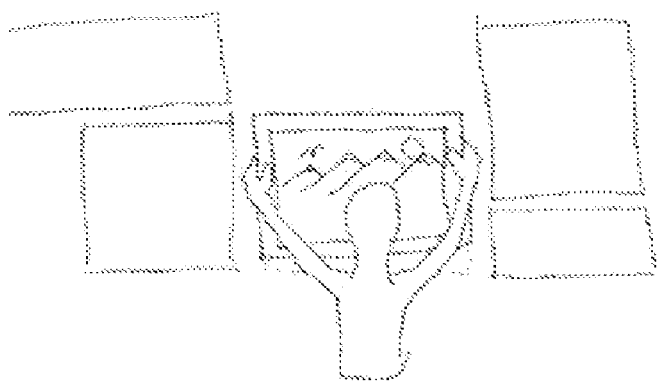
FIG. 23 shows another step according to the method of FIG. 22.
Figure 24:
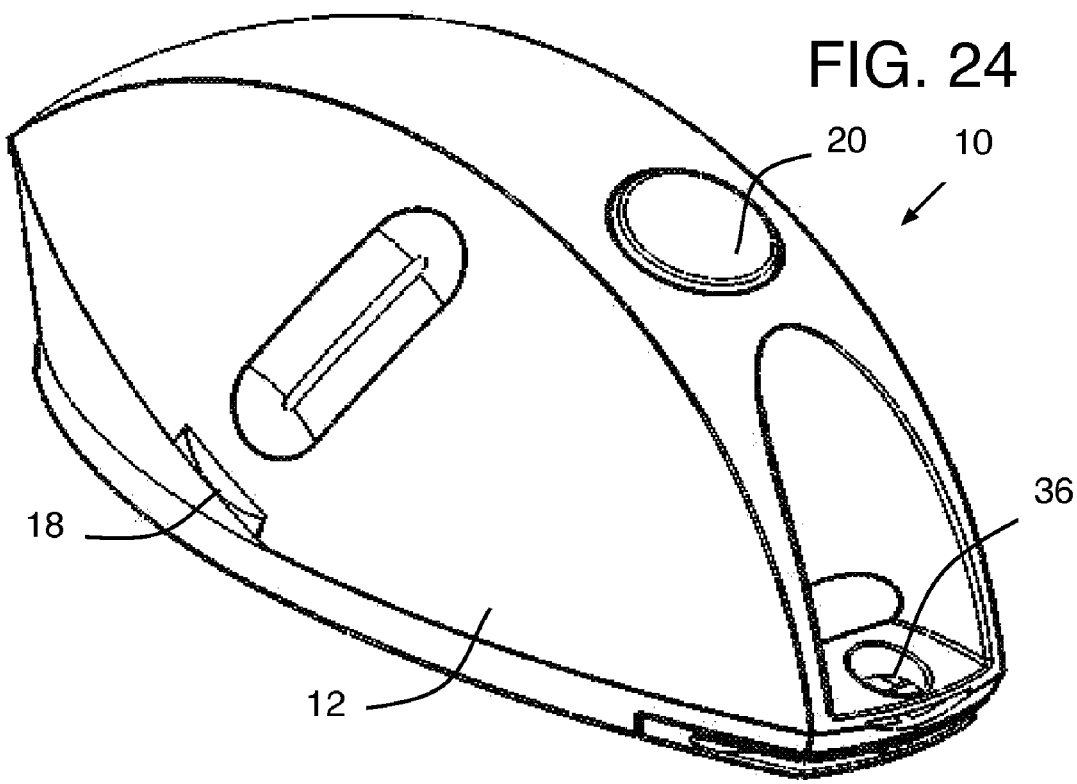
FIG. 24 is an offset top view of another embodiment of the present invention.
Figure 25:
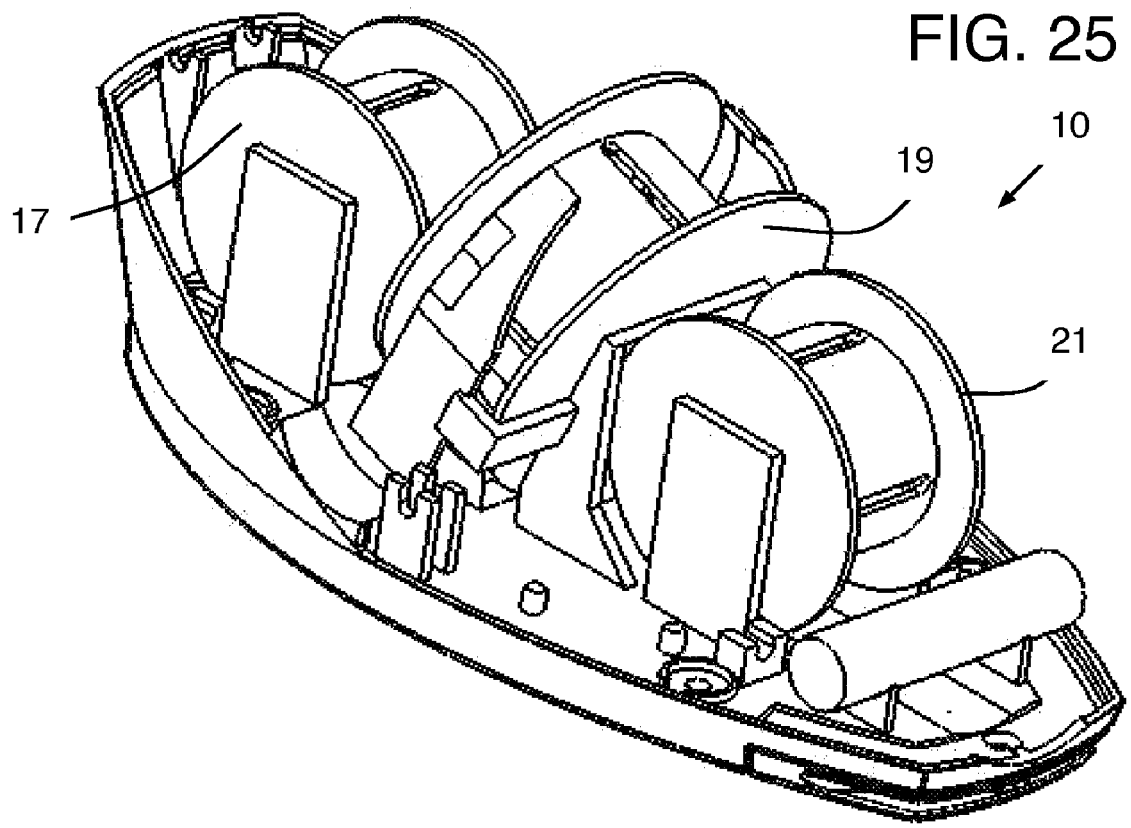
FIG. 25 is an offset top view of the embodiment of FIG. 24 with a top cover removed.
Figure 26:
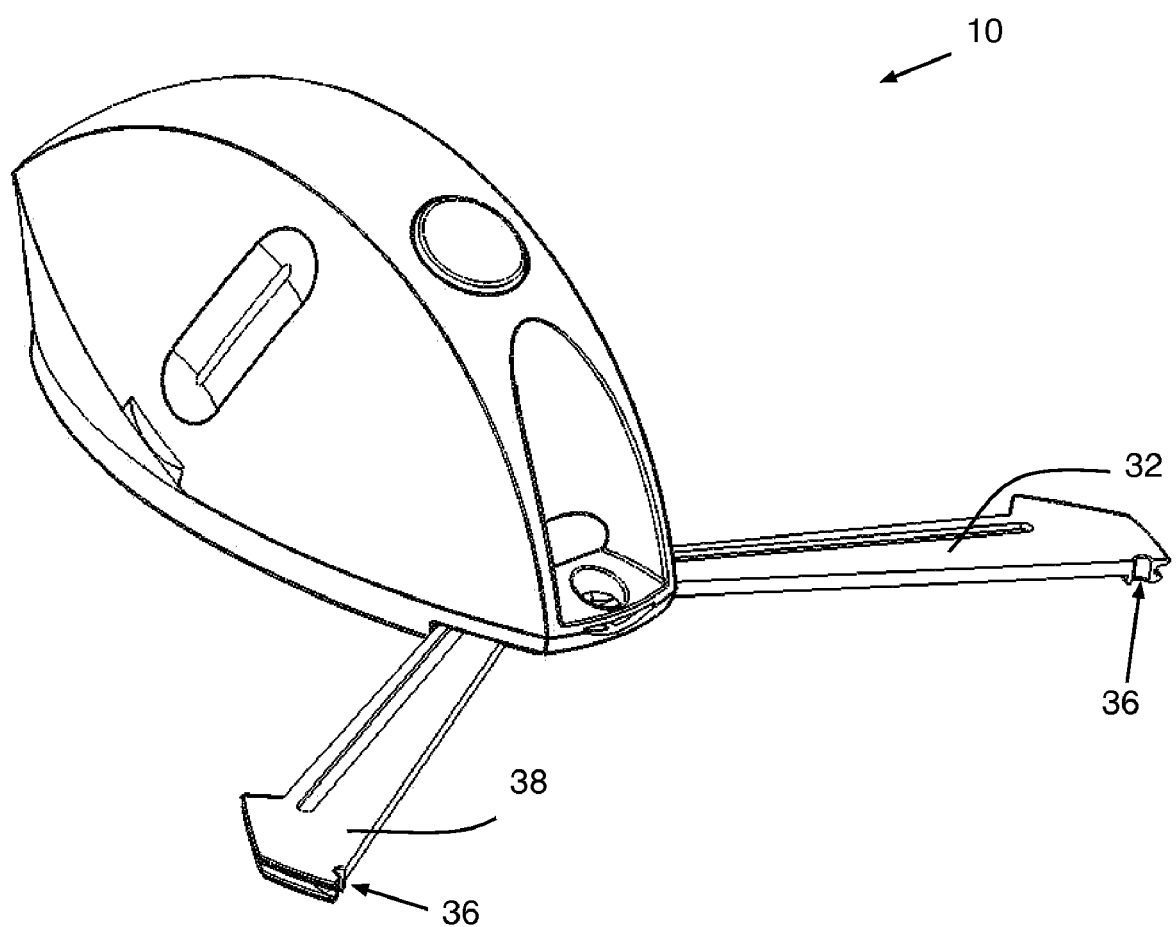
FIG. 26 is an offset top view of the embodiment of FIG. 24 with two aligning arms extended from the housing.

Additional steps include aligning the first vertical template with the first hooking point; extending the vertical-arm to determine a vertical-hanging position; and extending the first and second horizontal arms to determine a horizontal-hanging position. For example, FIG. 13 shows a conventional picture P and vertical wall W. A device 10 according to the present invention, in FIG. 14, is positioned on the back of the picture P, aligning the vertical template with the hanging device on the picture (in this case a wire strung between opposite frame member on the picture). The device 10, in FIG. 16, includes extendable horizontal arms 16 and 18, both having a scale means so that the device 10 may be centered on the picture's horizontal center-line. FIG. 16 shows a vertical template 35 aligning with the desired hanging position of the picture P. FIG. 17 shows the vertical template 14 being extended to align and measure the location of the bottom edge of the picture P. Then, as FIG. 18 shows, the device 10 is removed from the back of the picture and transferred to the wall, enabling the user to visualize the location of the picture by using the extended arms 14, 16, and 18 to represent the boundaries of the picture frame, while the vertical template 35 indicates the precise location of the nail or other hanging device to be placed in the wall. Then, as FIGS. 21 through 23 show, the device 10 translates to the wall where a mark is placed through the template 35. The user then nails a hanger in the wall and hangs the picture up.

Accordingly, a method of the present invention further includes the steps of: providing the wall-hanging-aid device with a locking mechanism for each retractable arm, locking the vertical-arm in the vertical-hanging position; and locking the first and second horizontal arms in the horizontal-hanging position.

Additionally, the method includes placing a mark on the vertical surface using the first vertical template to indicate the position corresponding to the first hooking point. And, providing the wall-hanging-aid having a second vertical template; locating a second hooking point on the object to be hung on the vertical surface; aligning the second vertical template with the first hooking point; and placing a mark on the vertical surface using the second vertical template to indicate the position corresponding to the second hooking point.

Figure 19:
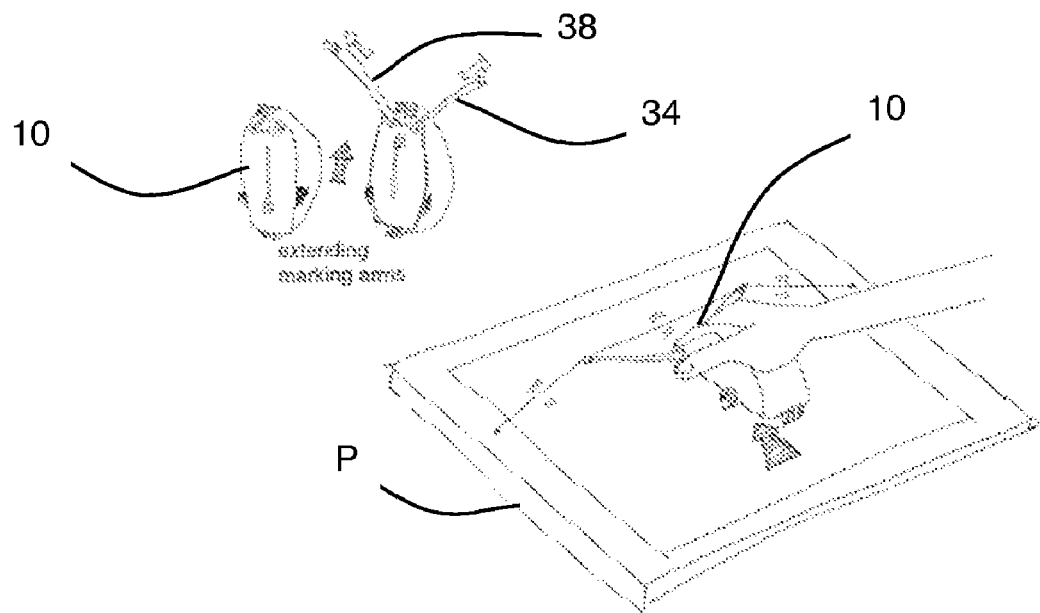
FIG. 19 is another possible environment of use of a second method according to the present invention.
Figure 20:
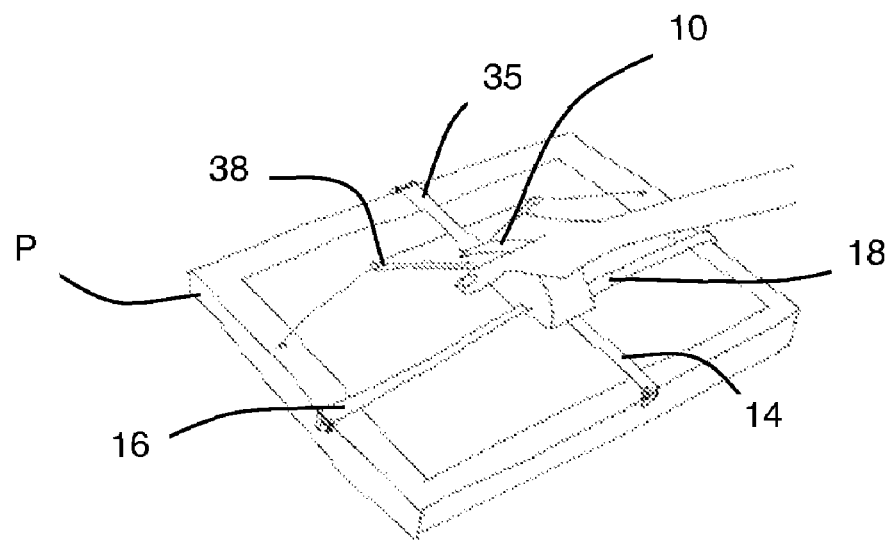
FIG. 20 shows a step according to the method of FIG. 19.

FIGS. 19 through 20 show a two-hanger method for locating the precise hanging location when the desired object requires two hooks or other hanging device as would be commonly used in this art. Accordingly, FIG. 19 shows the device 10 of the present invention having two extendable arms 38 and 34 being placed on the back of a picture P. Then, as FIG. 20 shows, the device is horizontally centered on the picture using the opposed pair of horizontal extension arms 16 and 18, each having a scale means thereon. The vertical position of the device 10 is set by extending the vertical arm 14, which also includes a scale for measuring and the template 35. The top or first vertical tape measure normally serves as a guide to help the user align the device in relation to the wall and to the article being hung. However, as the template fin 35 is not required for the two-hanger method, this serves primarily as a visual means when transferring the device to the wall. The user marks the two positions for each wall hanger using the extending arm templates 34 and 38.

Although the invention has been particularly shown and described with reference to certain embodiments, it will be understood by those skilled in the art that various changes in form and detail may be made without departing from the spirit and scope of the invention.

I claim:

1. A wall-hanging-aid device for locating a hanging position on a conventional wall having studs, the device comprising:
    a housing body adapted to contain a first and second vertical retractable-arm mechanism, a first horizontal retractable-arm mechanism and a second horizontal retractable-arm mechanism, and the housing body further adapted to enable a portion of each retractable-arm mechanism to extend therethrough;
    the first horizontal retractable-arm mechanism further comprising a first horizontal retractable arm including a second template means;
    the second horizontal retractable-arm mechanism further comprising a third template means;
    the first vertical retractable-arm mechanism further comprises a first measuring means and the second vertical retractable-arm mechanism further comprises a second measuring means;
    a first extendable vertical template arm arranged on a surface of the housing and further being enabled to have generally about 180-degrees of rotation relative to the housing, the rotation being disposed in a constructed plane defined by a first line representing a direction of extension of the first horizontal retractable arm mechanism and a second, generally perpendicular line representing a direction of extension of the first vertical retractable-arm mechanism; and
    a stud-finder means for locating the wall stud, the stud-finder means having a display apparatus, a portion of which is arranged on a visible surface of the housing.

2. The wall-hanging-aid device of claim 1 further comprising a horizontal-level indication means and a vertical-level indication means, each arranged on an visible surface of the housing.

3. The wall-hanging-aid device of claim 1 wherein each of the retractable-arm mechanisms further comprises a means for a locking-mechanism including an actuator arranged on the housing whereby a selected position of the associated retractable arm is locked in place by the actuator cooperating with the locking mechanism.

4. The wall-hanging-aid device of claim 1 wherein each retractable arm further comprises an associated distal end having a corresponding lip member arranged generally perpendicular to the arm.

5. A method for using a wall-hanging-aid device to mark a vertical surface a desired hanging position of an object, the method comprising:
    providing a wall-hanging-aid device having
        a first vertical template comprising a first retractable vertical-arm having a corresponding first vertical template hole guide,
        a first retractable horizontal arm,
        a second retractable horizontal arm, and
        a second vertical template comprising a second-vertical-template retractable arm having a second vertical template hole guide;
    locating a first hooking point on the object to be hung on the vertical surface;
    aligning the first vertical template hole guide with the first hooking point;
    extending the vertical-arm to determine a vertical-hanging position; and
    extending the first and second horizontal arms to determine a horizontal-hanging position;
    locating a second hooking point on the object to be hung on the vertical surface;
    aligning the second vertical template with the first hooking point; and
    placing a mark on the vertical surface using the second vertical template hole guide to indicate the position corresponding to the second hooking point.

6. The method of claim 5 further comprising:
    providing the wall-hanging-aid device with a locking mechanism for each retractable arm;
    locking the vertical-arm in the vertical-hanging position; and
    locking the first and second horizontal arms in the horizontal-hanging position.

7. The method of claim 5 further comprising:
    placing a mark on the vertical surface using the first vertical template hole guide to indicate the position corresponding to the first hooking point.

8. A wall-hanging-aid device comprising:
    a housing body adapted to contain a first vertical retractable-arm mechanism, a first horizontal retractable-arm mechanism and a second horizontal retractable-arm mechanism, and the housing body further adapted to enable a portion of each retractable-arm mechanism to extend therethrough, and wherein the first horizontal retractable-arm mechanism further comprises a first horizontal retractable arm including a first horizontal template means, and wherein the second horizontal retractable-arm mechanism further comprises a second horizontal template means;

a first extending arm member having a proximal end hingeably attached to the housing and an oppositely arranged distal end comprising a template means;

a second extending arm member having a proximal end hingeably attached to the housing and an oppositely arranged distal end comprising a template means; and a linking means coupling the first extending arm member to the second extending arm member whereby selective rotation of the first extending arm causes a corresponding but opposite rotation of the second extending arm member.

9. The wall-hanging-aid device of claim 8 wherein the housing is further adapted to contain a second vertical retractable-arm mechanism.

10. The wall-hanging-aid device of claim 9 wherein the second vertical retractable-arm mechanism further comprises a second retractable vertical-arm including a second vertical template means.

11. The wall-hanging-aid device of claim 9 further comprising a first horizontal measuring means arranged on the first horizontal retractable-arm and a second horizontal measuring means arranged on the second horizontal retractable-arm.

12. The wall-hanging-aid device of claim 9 wherein at least one of the retractable-arm mechanisms further comprises a vertical retractable arm having a distal end having a lip member arranged generally perpendicular to the arm.

13. The wall-hanging-aid device of claim 8 wherein the housing further comprises a linking mechanism coupled to the first and second horizontal retractable-arm mechanisms whereby extension of the first horizontal retractable-arm mechanism causes a simultaneous and corresponding extension of the second retractable-arm mechanism.

14. The wall-hanging-aid device of claim 8 wherein the first vertical retractable-arm mechanism further comprises a first retractable vertical-arm including a first vertical template means.

15. The wall-hanging-aid device of claim 8 wherein the vertical retractable-arm mechanism further comprises a first vertical measuring means arranged on a retractable vertical-arm.

16. The wall-hanging-aid device of claim 8 further comprising a horizontal-level indication means and a vertical-level indication means, each arranged on an exterior surface of the housing.

17. The wall-hanging-aid device of claim 8 wherein the housing further comprises a stud-finder means.

18. The wall-hanging-aid device of claim 8 wherein at least one of the retractable-arm mechanisms further comprises a means for a locking-mechanism including an actuator arranged on the housing whereby a selected position of the associated retractable arm is locked in place by the actuator cooperating with the locking mechanism.

* * * * *